United States Patent [19]
Schmidt et al.

[11] Patent Number: 6,157,499
[45] Date of Patent: Dec. 5, 2000

[54] LENS ARRANGEMENT SUITED FOR FOCUSING RADAR WAVES

[75] Inventors: Ewald Schmidt, Ludwigsburg; Heinz Pfizenmaier, Leonberg; Klaus Voigtlaender, Wangen; Klaus-Peter Wagner, Stuttgart; Bernhard Lucas, Mundelsheim; Thomas Beez, Weinsberg; Joerg Schneemann, Weissach, all of Germany

[73] Assignee: Robert Bosch GmbH, Stuttgart, Germany

[21] Appl. No.: 09/297,811

[22] PCT Filed: Oct. 15, 1997

[86] PCT No.: PCT/DE97/02357

§ 371 Date: Jul. 12, 1999

§ 102(e) Date: Jul. 12, 1999

[87] PCT Pub. No.: WO98/20579

PCT Pub. Date: May 14, 1998

[30] Foreign Application Priority Data

Nov. 7, 1996 [DE] Germany .................. 196 45 816

[51] Int. Cl.[7] .................. G02B 3/08; G02B 11/00

[52] U.S. Cl. ............................. 359/741; 359/642
[58] Field of Search .................. 359/619–628, 359/733–736, 741, 743, 642; 342/70–72; 434/1–5; 701/223

[56] References Cited

U.S. PATENT DOCUMENTS

| 5,220,462 | 6/1993 | Feldman, Jr. ............ 359/855 |
| 5,400,038 | 3/1995 | Riza et al. ............... 342/375 |
| 5,929,980 | 7/1999 | Yamaguchi et al. ...... 356/4.03 |

FOREIGN PATENT DOCUMENTS

WO97/06406  2/1997  WIPO .

Primary Examiner—Georgia Epps
Assistant Examiner—Jordan M. Schwartz
Attorney, Agent, or Firm—Kenyon & Kenyon

[57] ABSTRACT

In a lens arrangement for collimating radar waves for distance sensors, in particular for motor vehicles, several sublenses are arranged integrally next to one another. A lobe enlargement necessary for angular analysis is thereby achieved. The range is only slightly reduced as compared to a lens having a surface area of the same size.

10 Claims, 1 Drawing Sheet

LENS ARRANGEMENT SUITED FOR FOCUSING RADAR WAVES

FIELD OF THE INVENTION

The present invention relates to a lens arrangement for collimating radar waves for distance sensors, in particular for motor vehicles.

BACKGROUND INFORMATION

Lenses of rotationally symmetrical configuration for distance sensors are known, portions of the round projection surface being omitted in order to adapt the lens to a predefined housing geometry. The cross-sectional shapes of the lenses are aplanar, planoconvex, biconvex, or meniscus, in each case with or without fresnel patterning; and plano-plano in the case of phase-delayed lenses with fresnel rings. These lenses have in common the fact that for a predefined distance between the so-called patches used as the transmission and reception antennas, as the horizontal lens diameter becomes smaller, the horizontal lobe angle increases but the antenna gain and thus the range of the distance sensor decreases. A specific lobe width is necessary, however, in order to sense objects located obliquely in front of the vehicle.

Three horizontally offset lobes are often used in these conventional distance sensors, for which purpose three patches are provided. The central one of the three patches lies on the longitudinal axis at the lens focal point, and the other patches horizontally to the left and right thereof. This results in three antenna lobes, one normal lobe and two diametrically "cross-eyed" lobes, which each cover a certain angular range and can be utilized for distance and angle detection of a target. Care must be taken to avoid the occurrence of zones with insufficient range between the lobes of the individual patches, so that targets located in those zones are detected too late or not at all.

As already mentioned, however, the width of the lens cannot be made as small as desired in order to enlarge the lobe angle, since otherwise the overall range becomes too small. For the case of installation in a vehicle, moreover, a lens in the shape of a horizontal rectangle is desirable.

SUMMARY OF THE INVENTION

The object of the present invention is therefore to describe a lens arrangement with which sufficiently large lobe angles are possible without causing the surface area, and in particular the extension in the direction of the desired larger lobe angle, to fall below a predefined dimension.

This object is achieved, according to the present invention, in that several sublenses are arranged integrally next to one another. Provision is preferably made in this context for the focal points of the sublenses to lie in a plane parallel to the lens plane.

The arrangement according to the present invention results, for each beam, in a lobe enlargement necessary for angular analysis. The range is only slightly reduced as compared to a lens having a surface area of the same size.

For applications in which vertical angle detection is to be accomplished, the lens arrangement according to the present invention can be oriented vertically with the same advantages.

An enlarged lobe angle can be achieved, in particular, in that the extension of at least one central lens is less in the longitudinal direction of the overall lens arrangement than in the transverse direction.

An advantageous embodiment of the present invention lies in the fact that three sublenses are provided. The lens arrangement according to the present invention can, however, also be carried out with two or with more than three lenses.

Another advantageous embodiment of the present invention lies in the fact that the sublenses have the shape of hyperboloids. Other lens shapes, for example the lens shapes mentioned initially, are nevertheless also possible.

An advantageous development lies in the fact that the axes of lateral sublenses are tilted with respect to the axis of at least one central sublens. A more favorable collimation of the radar waves by the lateral sublenses is thereby achieved.

In another development of the present invention, a relatively simple but effective lens arrangement is achieved in that the at least one central sublens is curved only in the transverse direction of the overall lens arrangement. In this context, provision is preferably made for the at least one central sublens to have a straight apex line which interconnects vertices of the two lateral sublenses.

DETAILED DESCRIPTION

Figure 1:
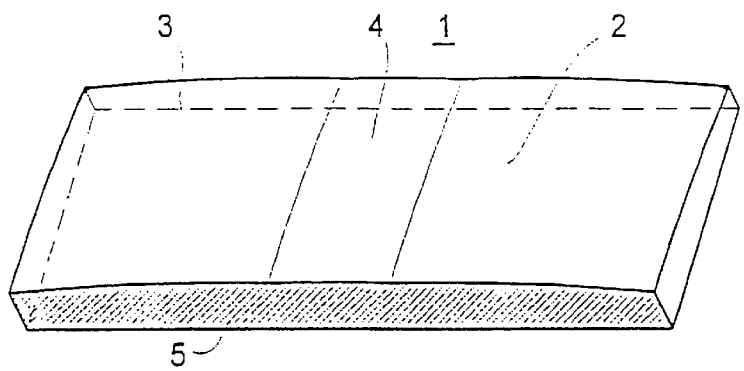
FIG. 1 shows a perspective view of a longitudinally sectioned exemplary embodiment of a lens arrangement according to the present invention.

The lens arrangement shown in FIG. 1 comprises two lateral sublenses 2, 3 and one central sublens 4, and is shown sectioned in plane 5. The lens arrangement can be economically injection-molded using a thermoplastic, for example PC, PE, PS, PP, or PTFE, or can be pressed and sintered using ceramic, preferably aluminum oxide or titanium dioxide.

Figure 2:
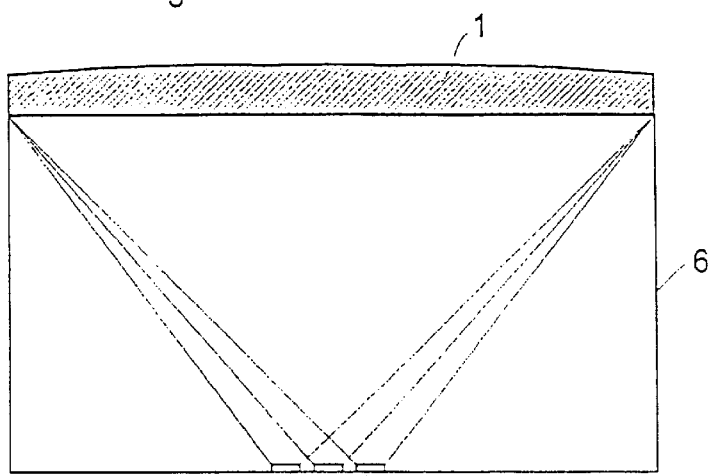
FIG. 2 shows the exemplary embodiment of FIG. 1 in a sectioned view together with schematically indicated further parts of a distance sensor.

FIG. 2 shows a longitudinal section through lens arrangement 1, which is joined to a housing 6 of a distance sensor in which three transmit/receive patches 7, 8, 9 are arranged. The edge beams of the beams proceeding from and received by the patches are indicated.

Figure 3:
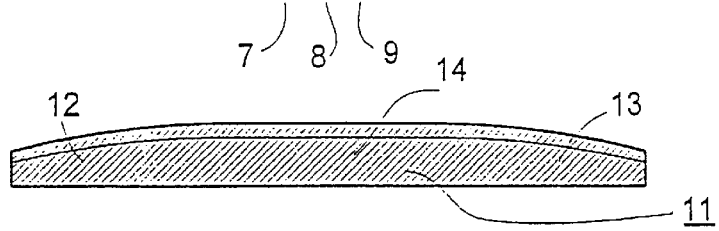
FIG. 3 shows a longitudinal section through a second exemplary embodiment of the lens arrangement according to the present invention.

FIG. 3 shows a longitudinal section through a second exemplary embodiment, the curvature of the lenses being depicted in exaggerated fashion for illustrative purposes. This lens arrangement 11 is characterized in that central sublens 14 is curved only in the transverse direction. As in the exemplary embodiment defined in FIG. 1, lateral sublenses 12, 13 are curved in both directions.

Figures 4, 5:
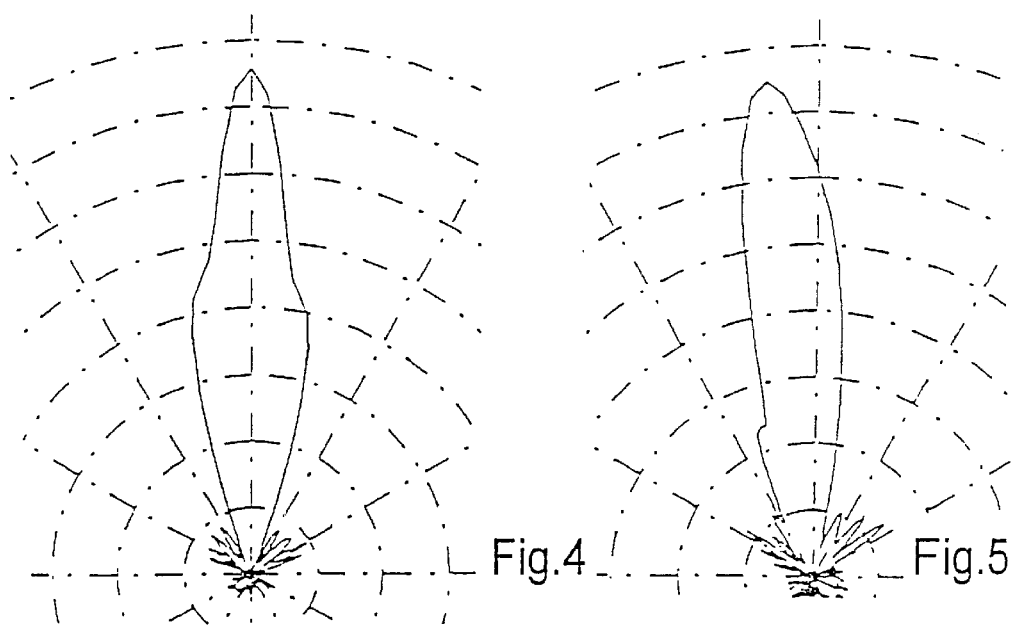
FIG. 4 shows an antenna diagram of a lens arrangement according to the present invention for a central patch.
FIG. 5 shows an antenna diagram for a lens arrangement according to the present invention for a right-hand patch.

FIG. 4 shows an antenna diagram of a central patch, the lobe angle being enlarged by comparison with a one-piece lens of the same size. The lobe angle for a lateral patch (in FIG. 5, the right-hand patch) is also enlarged, thus prevented dips in range in the transitional regions between the lobes.

What is claimed is:

1. A lens arrangement for collimating radar waves for a distance sensor, comprising:

a plurality of sublenses situated integrally next to one another and collimating radar waves for a distance sensor.

2. The lens arrangement according to claim 1, wherein a motor vehicle includes the distance sensor.

3. The lens arrangement according to claim 1, wherein a focal point of each of the plurality of sublenses is situated in a first plane, the first plane being parallel to a second plane of the lens arrangement.

4. The lens arrangement according to claim 1, wherein the plurality of sublenses include at least one central lens, the at least one central lens having a first extension in a longitudinal direction of the lens arrangement and a second extension in a transverse direction of the lens arrangement, the first extension being smaller than the second extension.

5. The lens arrangement according to claim 1, wherein the plurality of sublenses include three sublenses.

6. The lens arrangement according to claim 1, wherein at least one of the plurality of sublenses has a shape of a hyperboloid.

7. The lens arrangement according to claim 1, wherein lateral sublenses of the plurality of sublenses have a first axis, at least one central sublens of the plurality of sublenses having a second axis, the first axis being tilted with respect to the second axis.

8. The lens arrangement according to claim 1, wherein at least one central sublens of the plurality of sublenses is curved only in a transverse direction of the lens arrangement.

9. The lens arrangement according to claim 1, wherein at least one central sublens of the plurality of sublenses has a straight apex line, the straight apex line interconnecting vertices of two lateral sublenses of the plurality of sublenses.

10. The lens arrangement according to claim 1, wherein:

the plurality of sublenses are situated on the distance sensor.

* * * * *